United States Patent [19]

Rudrapatna et al.

[11] Patent Number: 6,052,598
[45] Date of Patent: Apr. 18, 2000

[54] METHOD FOR PREDICTING THE LOCATION OF A MOBILE STATION IN A MOBILE COMMUNICATIONS NETWORK

[75] Inventors: Ashok N. Rudrapatna, Basking Ridge, N.J.; Dharma P. Agrawal, Raleigh, N.C.; Prathima Agrawal, New Providence, N.J.

[73] Assignee: AT&T Corp, New York, N.Y.

[21] Appl. No.: 08/941,231

[22] Filed: Sep. 30, 1997

[51] Int. Cl.$^7$ ...................................................... H04Q 7/20
[52] U.S. Cl. .......................... 455/456; 455/441; 455/436
[58] Field of Search .................................. 455/429, 432, 455/436, 438, 437, 439, 440, 441, 442, 443, 422, 456, 525, 38.3, 524, 435, FOR 101, FOR 102, FOR 103; 379/FOR 105

[56] References Cited

U.S. PATENT DOCUMENTS

| | | |
|---|---|---|
| 5,214,789 | 5/1993 | George . |
| 5,222,249 | 6/1993 | Carney . |
| 5,230,082 | 7/1993 | Ghisler et al. . |
| 5,390,234 | 2/1995 | Bar-Noy et al. . |
| 5,408,466 | 4/1995 | Albay .......................................... 455/426 |
| 5,432,842 | 7/1995 | Kinoshita et al. ......................... 455/441 |
| 5,465,389 | 11/1995 | Agrawal et al. ........................... 455/441 |
| 5,471,497 | 11/1995 | Zehavi ...................................... 375/200 |
| 5,524,136 | 6/1996 | Bar-Noy et al. . |
| 5,572,221 | 11/1996 | Marlevi et al. ........................... 455/440 |
| 5,642,398 | 6/1997 | Tiedemann, Jr. ......................... 455/435 |

(List continued on next page.)

FOREIGN PATENT DOCUMENTS

| | | | |
|---|---|---|---|
| 000589279 | 9/1992 | European Pat. Off. ...... | 379/FOR 105 |
| 401073925 | 3/1989 | Japan .............................. | 379/FOR 105 |

OTHER PUBLICATIONS

"Automatic Vehicle Location—An Overview", authors: S. Riter, J. McCoy; IEEE Transactions on Vehicular Technology, Vo. VT–26, No. 1, pp. 7–11, Feb. 1977.

"Estimating Position and Velocity of Mobiles in a Cellular Radio Network", authors: M. Hellebrandt, R. Mathar, M. Scheibenbogen; IEEE Transactions on Vehicular Technology, vol. 46 No. 1, Feb. 1997, pp. 65–71.

"Location Management Strategies for Mobile Cellular Networks of 3rd Generation", author: D. Plassmann, 1994 IEEE 44th Vehicular Technology Conference, vol. 1, pp. 649–643, Jun. 8–10, 1994.

"A Alternative Strategy for Location Tracking", author: S. Tabbane, IEEE Journal of Selected Areas in Communications, vol. 13, No. 5, pp. 880–892, Jun. 1995.

"Efficient and Flexible Location Management Techniques for Wireless Communication Systems", authors: J. Jannink, D. Lam, N. Shivakumar, J. Widom, D.C. Cox; Mobicom '96, pp. 38–49, Nov. 10–12, 1996.

"Location Uncertainity in Mobile Networks: A Theoretical Framework", authors: C. Rose, R. Yales; IEEE communications Magazine, pp. 94–101, Feb. 1997.

(List continued on next page.)

*Primary Examiner*—Dwayne D. Bost
*Assistant Examiner*—Jean Gelin

[57] ABSTRACT

The approximate position of a mobile station in a cell can be predicted by measuring the signal strength between the mobile station and the base station of the cell in which it is located and the base stations of the neighboring cells. After a series of instantaneous signal strength measurements have been collected, the velocity and direction of the mobile unit can be determined. Based on the velocity and direction of the mobile unit, future locations of the mobile unit can be predicted including the projected signal strength between the mobile station and the base stations of the cell in which it is located and neighboring cells. Analyzing the projected signal strength values, the time when the mobile unit will require handover to a neighboring cell can be determined and if desired, resources in a neighboring cell can be allocated in anticipation of the mobile unit being handed over to that cell. New signal strength measurements are periodically collected and new projections are made to increase the accuracy of the estimate of when handover will occur and to what neighboring cell.

15 Claims, 3 Drawing Sheets

U.S. PATENT DOCUMENTS

| | | | |
|---|---|---|---|
| 5,687,217 | 11/1997 | Bliss et al. | 455/423 |
| 5,787,348 | 7/1998 | Willey et al. | 455/441 |
| 5,825,759 | 10/1998 | Liu | 455/433 |
| 5,884,178 | 3/1999 | Ericsson et al. | 455/441 |

OTHER PUBLICATIONS

"A Knowledge–Based Resource Allocation Algorithm for Cellular Networks", authors: A. Rudrapatna, P. Agrawal, D.P. Agrawal, C. Giardina; ICPWC'97, pp. 1–5, Aug. 20, 1997.

METHOD FOR PREDICTING THE LOCATION OF A MOBILE STATION IN A MOBILE COMMUNICATIONS NETWORK

TECHNICAL FIELD

This invention relates to predicting the location of a mobile station in a mobile communications network and, more particularly, to a scheme for approximating the location of a mobile station at cell level in a mobile network, which can be used to estimate a time for handover.

BACKGROUND OF THE INVENTION

Most existing mobile communication systems incorporate a cellular architecture in which geographical areas are divided into roughly equal sized cells. Each cell contains a base station for interfacing mobile units in the cell to a mobile switching center (MSC) and a backbone wired network. The MSC connects the base stations together for communication therebetween. A base station is equipped with radio transceivers that enable rf communications over available frequency channels with mobile units in the cell.

Techniques for determining the location of mobile stations exist in the prior art. One known method involves using a global positioning system (GPS). To determine the location of a mobile station, GPS requires that the mobile station be in the field of view of a satellite. Mobile stations travel through tunnels and into buildings and many other areas where satellite signals cannot penetrate. Thus, when a mobile station is in one of these areas, GPS cannot determine the location of the mobile station. Furthermore, mobile stations need to communicate GPS location information to the network requiring use of rf channels.

Another method directly measures radio signals traveling between a set of base stations and a mobile station and then back to the base stations. Time or phase measurements obtained by such a trilateration method are used to determine the length or direction of the radio path. This requires expensive systems at the base station and precise synchronization across base stations to obtain reliable location data.

Recently, a highly accurate method for estimating the position and velocity of mobile stations has been developed which is described in the article entitled "Estimating Position and Velocity of Mobiles in Cellular Radio Networks" by Hellebrandt et al. in IEEE Transactions on Vehicular Technology, Vol. VT-26, No. 1, pp. 7–11, February 1997. According to this technique, the actual downlink strength of six adjacent base stations is measured by mobile stations at predefined locations. Profiles are developed for the predefined locations and stored in a database. Then, the average signal strength of the six base stations is measured by the mobile station at its current location. The best squares are estimated and compared with the profiles stored in the database. The point in the cell providing the minimum least-square error and satisfying the transformed signal data is considered as the location of the mobile station. Here again, the location information which is known to the mobile station needs to be conveyed to the network via wireless channels.

SUMMARY OF THE INVENTION

The present invention overcomes the shortcomings of the prior art by providing a scheme which determines the approximate location of a mobile station in a cell. In contrast to the prior art schemes which attempt to locate the precise position of the mobile station in a cell, the present invention is directed to determining the location of the mobile station directly from the network and anticipating the next cell to which the mobile station is likely to enter. The present invention can be adapted to project the anticipated crossing of a cell boundary so that resources in a neighboring cell to which the mobile station is projected to enter can be reserved.

Knowing the cell where a mobile unit is located, a measurement of the velocity of the mobile unit, and the direction in which the mobile unit is traveling, the probability of crossing the current cell boundary and the anticipated time for cell crossing can be determined. The received power of the mobile unit can be measured by adjacent base stations or the received power of base stations can be measured by the mobile unit. Such uplink/downlink power can be measured for either analog or digital cellular/PCS systems.

Power averaged over a certain duration can be estimated to smooth temporary localized fading and other types of multipath fading caused by obstructions, such as buildings and mountains. According to an illustrative embodiment of the present invention, power averaging can be achieved by using a "rolling window" of signal strength values to determine the averaged signal strength values. That is, as the mobile unit moves, new signal strength values are obtained and used in power averaging. The network can use the averaged signal strength values to estimate the velocity of the mobile unit and the direction in which the mobile unit is traveling.

The measured velocity and direction of the mobile unit can be used to project anticipated velocity and direction of mobiles for times in the immediate future, and can be used to anticipate cell handover needs. That is, it can be projected when the signal strength of the mobile unit will fall below a threshold in which handover must occur, and an appropriate cell can be identified to which a call can be handed over. Accordingly, the network can utilize this information to anticipate resource allocation needs of a mobile unit.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

An illustrative methodology for predicting the location of a mobile station in a mobile communications system will be described according to the present invention. While the mobile system described below relates to a traditional cellular phone system, it is to be understood that the present invention can be applied to all types of mobile communications systems including, but not limited, to satellite systems, micro cellular systems, systems utilizing FDMA, TDMA, or a hybrid thereof, and other wireless communication systems. Also, other types of personal communication devices can be implemented in these systems including, but not restricted to, a portable television, a wireless audio video phone, and a pager.

The present invention may be used in connection the invention described in the commonly assigned, co-filed application entitled "Intelligent Dynamic Channel Allocation Scheme for a Mobile Communications Network" by the same inventors of the instant application, which is incorporated by reference herein.

Figure 1:
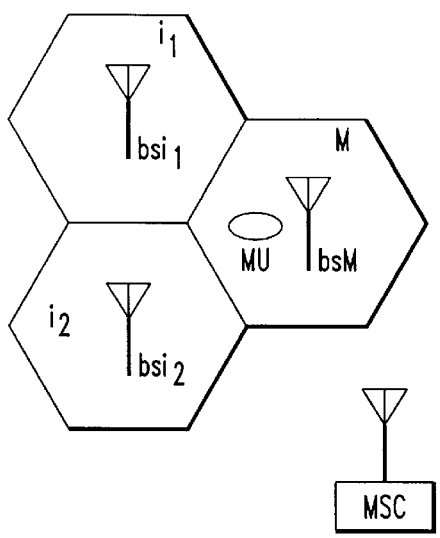
FIG. 1 is a portion of a wireless communications network according to an illustrative embodiment of the present invention.

An illustrative mobile network is shown in FIG. 1 including three cells, M, $i_1$, and $i_2$, and a mobile switching center MSC. The cells, M, $i_1$, and $i_2$, contain a corresponding base station bsM, $bsi_1$, and $bsi_2$, respectively. Located in cell M is mobile unit MU. It is to be understood that the mobile network depicted in FIG. 1 is illustrative, and that other wireless network structures are considered within the scope of the invention.

Figure 2:
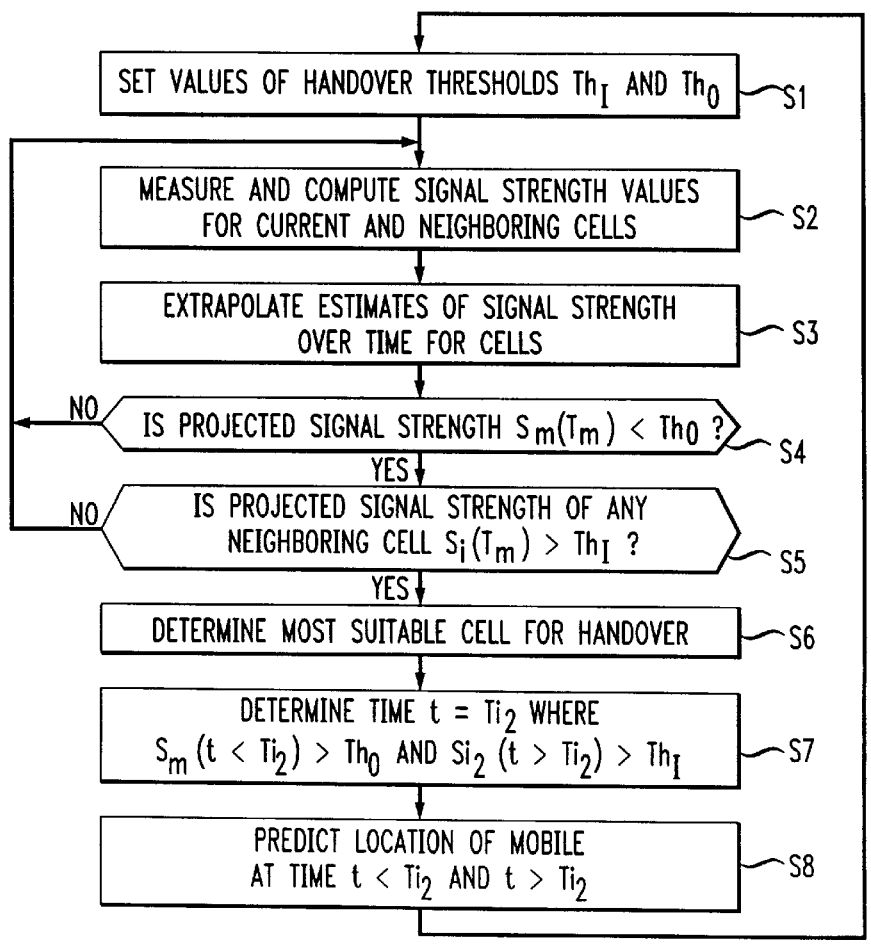
FIG. 2 is a flow chart illustrating the steps involved in an exemplary embodiment of the method of the present invention.
Figure 3:
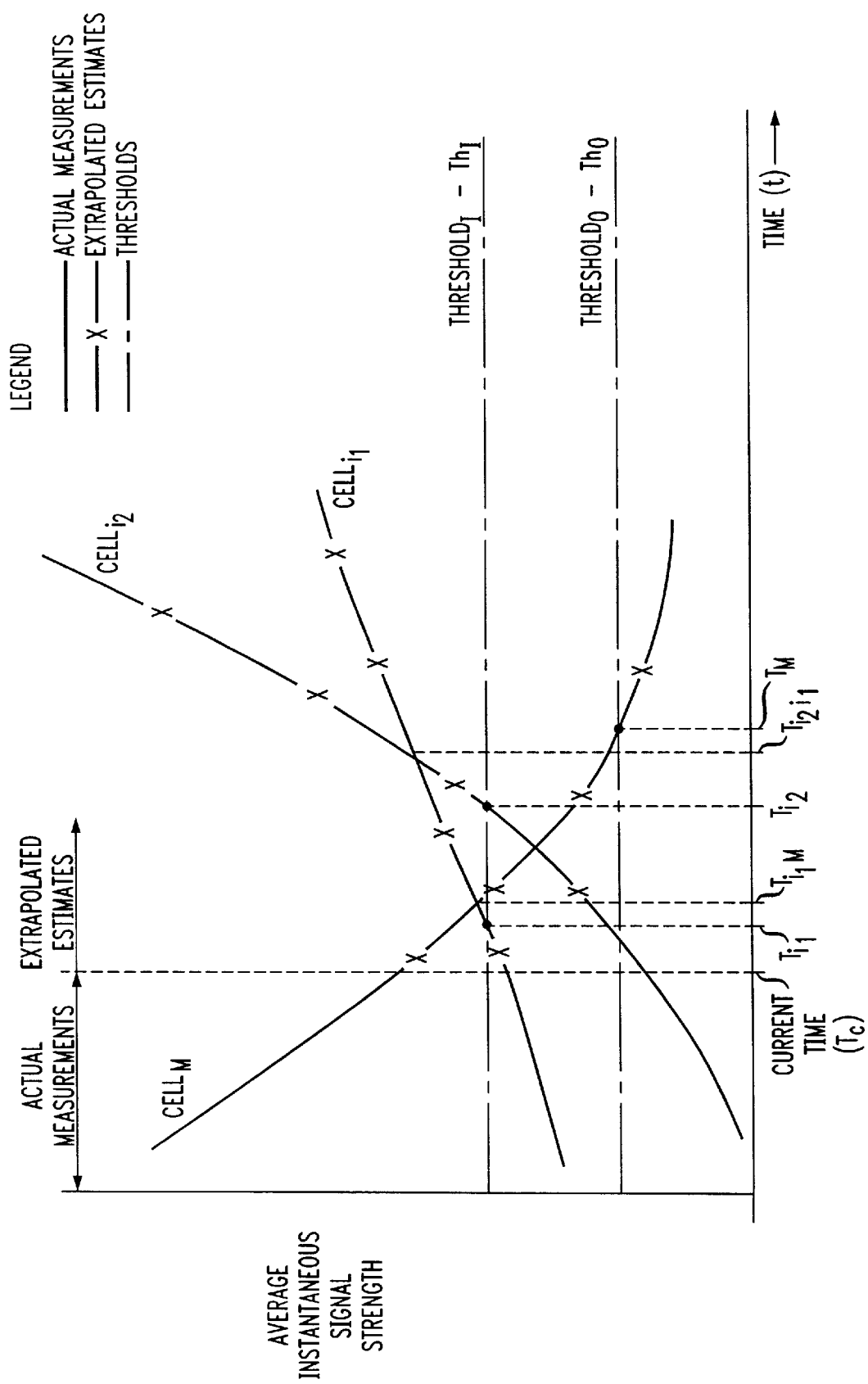
FIG. 3 is an illustrative graph of received signal strength over time in accordance with an exemplary embodiment of the method of FIG. 2.

An illustrative method for cell-level location predicting according to the present invention is set forth in FIG. 2 and described with reference to FIGS. 1–3. FIG. 3 is a graph showing the received signal strength over time for an illustrative embodiment of the present invention described in connection with FIGS. 1 and 2. Referring to FIG. 1, the cell M represents the cell in which the mobile unit MU is currently traveling. The cells $i_1$ and $i_2$ represent cells neighboring cell M. For purposes of this illustration, it is assumed that the mobile unit MU is moving toward neighboring cells $i_1$ and $i_2$, such that the signal strength between MU and bsM (i.e., $S_M(t)$) is declining and the signal strengths between MU and $bsi_1$ and $bsi_2$ (i.e., $Si_1(t)$ and $Si_2(t)$, respectively) is increasing. This can be seen by inspection of FIG. 3.

At step S1, threshold values for incoming handoff $Th_I$, and outgoing handoff $Th_O$ are defined. The threshold values $Th_I$ and $Th_O$ are typically predefined or preset in the mobile network. Threshold $Th_I$ represents the mobile link minimum signal strength in the forward link (base to mobile) or reverse link (mobile to base) at which a call can be accepted for handoff by a neighboring cell. For example, if the projected signal strength is less than $Th_I$, for the mobile link between the base station $bsi_1$ and the mobile unit MU at a given time then cell $i_1$ is not a candidate for handover at that time. Threshold $Th_O$ represents the mobile link signal strength in the forward link (base to mobile) or reverse link (mobile to base) at which the mobile network actively seeks to handover a call from the current cell (e.g., M) to a neighboring cell (e.g., $i_1$). Although, the thresholds $Th_I$ and $Th_O$ could theoretically be the same, $Th_I$ is somewhat larger than $Th_O$.

At step S2, the network computes the instantaneous average signal strength between the mobile unit MU and the base station bsM and the signal strengths between the mobile station MU and the base stations in neighboring cells including $bsi_1$ and $bsi_2$ and other base stations in neighboring cells which are not shown. The mobile link signal strength can be measured in either the forward or reverse direction. Either forward or reverse link measurements can be used in AMPS or TDMA, but it is easier to implement measurements in the reverse direction in AMPS. Measurements in the forward direction are better used in TDMA. For simplicity, either the forward or reverse direction will be used on a consistent basis for measuring the signal strength in the mobile network. The signal strength measurements can be made by each of the base stations bsM, $bsi_1$, and $bsi_2$. These values are preferably transferred to the MSC or a centralized part of the mobile network. Alternatively, the signal strength measurements could be transferred to the base station in the cell in which the mobile is located bsM.

In step S3, the MSC extrapolates the estimates of signal strength over time for the mobile unit MU and the base stations of the current cell M and the neighboring cells $i_1$, $i_2$, . . . etc. That is, the MSC projects what the signal strength between the mobile unit MU and the base stations of the current cell and neighboring cells will be at times in the future based on the actual measurements up to the current time. Extrapolation uses standard curve fitting techniques. In each cellular area, an appropriate propagation model will be used based on the known propagation environment in the cell. Propagation behavior can vary from cell to cell based on multipath fading resulting from factors such as topography and buildings.

In FIG. 3, the actual measurements for the signal strengths of the cells M, $i_1$ and $i_2$ are represented by the solid lined portion of the curves (cell M, cell $i_1$, and cell $i_2$) left of the dashed vertical line identified as current time $t_c$. The extrapolated or projected signal strengths are shown by the portion of those same lines to the right of the current time $t_c$, in FIG. 3.

It should be understood that at least two instantaneous measurements must be made in step S2, prior to the first time signals strength estimates are extrapolated in step S3, to obtain the velocity and direction of the mobile unit MU. Generally, the more signal strength measurements taken, the more accurate the projections. Signal strength measurements can be made on a periodic basis which may be a function of the cell size or an expected maximum speed or average speed of a mobile in the current cell. For example, in a mobile network with cells having approximately a five-mile radius, it would be appropriate to measure signal strength on the order of every 15 seconds. Similarly, based on the expected velocity of a mobile unit at a particular time of day, for example rush hour, a less frequent measurement may be sufficient. Also, the periodic interval may be determined in real time and based on factors including, but not restricted to, maximum estimated or average velocity of the mobile unit and network traffic.

In step S4, it is determined whether the projected signal strength between the mobile station MU and its current base station bsM will drop below the threshold for call handover $Th_O$. For accuracy purposes, projections are best made for a limited time into the future. For example, projections may only be made for one minute into the future. The appropriate time period in which to project signal strength measurement can be preset in accordance with factors including, but not limited to, cell size, maximum estimated velocity of a mobile unit in the particular cell, time-of-day, day-of-week, and neighboring cell channel traffic volume. Alternatively, the time period for projections may be determined on a real time basis in accordance with factors such as the velocity of the mobile unit and the current radio channel traffic conditions of neighboring cells.

If the projected signal strength between the mobile MU and its current base station bsM does not fall below $Th_O$ (i.e., $S_M(T_M) \geq Th_O$, where $T_M$ is the estimated time at which $S_M(t)=Th_O$) then control returns to S2 and additional signals strength data is collected and average signal strengths are computed and at step S3 the extrapolated estimates are updated and the process continues. Updating does not require recomputing the entire curve. It can be used to refine existing data.

If the projected signal strength between the mobile MU and its current base station bsM falls below Tho (i.e., $S_{M(TM)}$<$Th_O$) then the process shifts to step S5. At step S5, it is determined whether the projected signal strength of any neighboring cell is greater than the incoming handover threshold $Th_I$, (e.g., is $Si_1(T_M)$>$Th_I$ or $Si_2(T_M)$>$Th_I$?). In other words, is there a neighboring cell which is appropriate for handover at the projected time that the signal strength between the mobile unit MU and its current base stations bSM falls below the threshold for outgoing handover. If not, then control returns to S2 and the aforedescribed steps are repeated.

If a neighboring cell is appropriate for handover, then control shifts to step S6. In step S7, the projected signal strength for each of the neighboring cells appropriate for handover (i.e., $Sij(T_M)$>$Th_I$) are compared with each other and the most suitable cell is selected. Determination of the most suitable cell is a matter of design choice and may be, but is not limited to, the cell having the highest projected signal strength over a selected (e.g., longest) duration or the cell having the highest projected signal strength at the estimated time of handover $T_M$.

Next, control passes to step S7 where the time (e.g., t=$Ti_2$) is determined when the neighboring cell (e.g., $i_2$) selected for handover has a signal strength appropriate for incoming handover ($Si_2(t$>$Ti_2)$>$Th_I$) and when the signal strength between the mobile unit and the current base station is greater than the outgoing handover threshold ($S_M(t$<$Ti_2)$ >$Th_O$), which is typically below $Th_I$.

Control of the process passes to step S8, where the determined time (t=$Ti_2$) provides the time at which handover can be set to occur in accordance with the signal strength projections, and the predicted location of the mobile unit. Thus, following this example, for t<$Ti_2$, the predicted location of the mobile unit will be in cell M, at time t=$Ti_2$ it is predicted that handover will occur, and at time t>$Ti_2$ the predicted location of the mobile unit will be in cell $i_2$. Thus, wireless resources can be allocated for the mobile unit in cell $i_2$ in anticipation of handover occurring at time t=$Ti_2$.

After step S8, handover into a neighboring cell (e.g., $i_2$) has occurred. Thus, the neighboring cell can be viewed as the current cell. Control returns to step S2 to predict the mobile location in the new current cell (e.g., $i_2$) and the former cell M now is a neighboring cell to the current cell (e.g., $i_2$).

Typically, the signal strength between the mobile unit MU and the neighboring cell base station bsM decreases, while the signal strength between the mobile unit MU and at least one other adjacent base station increases. There may be instances where after some time in the new cell, the signal strength between the mobile unit and the former base station increases at which time a new projection algorithm will have to be used. A new projection algorithm may also have to be used when a change from a decrease to an increase in signal strength between the mobile unit and the base station of a neighboring cell occurs or vice versa. A new projection algorithm may be implemented when an instantaneous signal strength directional change is detected, although it is preferable to implement the new projection algorithm after a series of instantaneous signal strength values continues to increase or decrease following a directional change.

Figure 4:
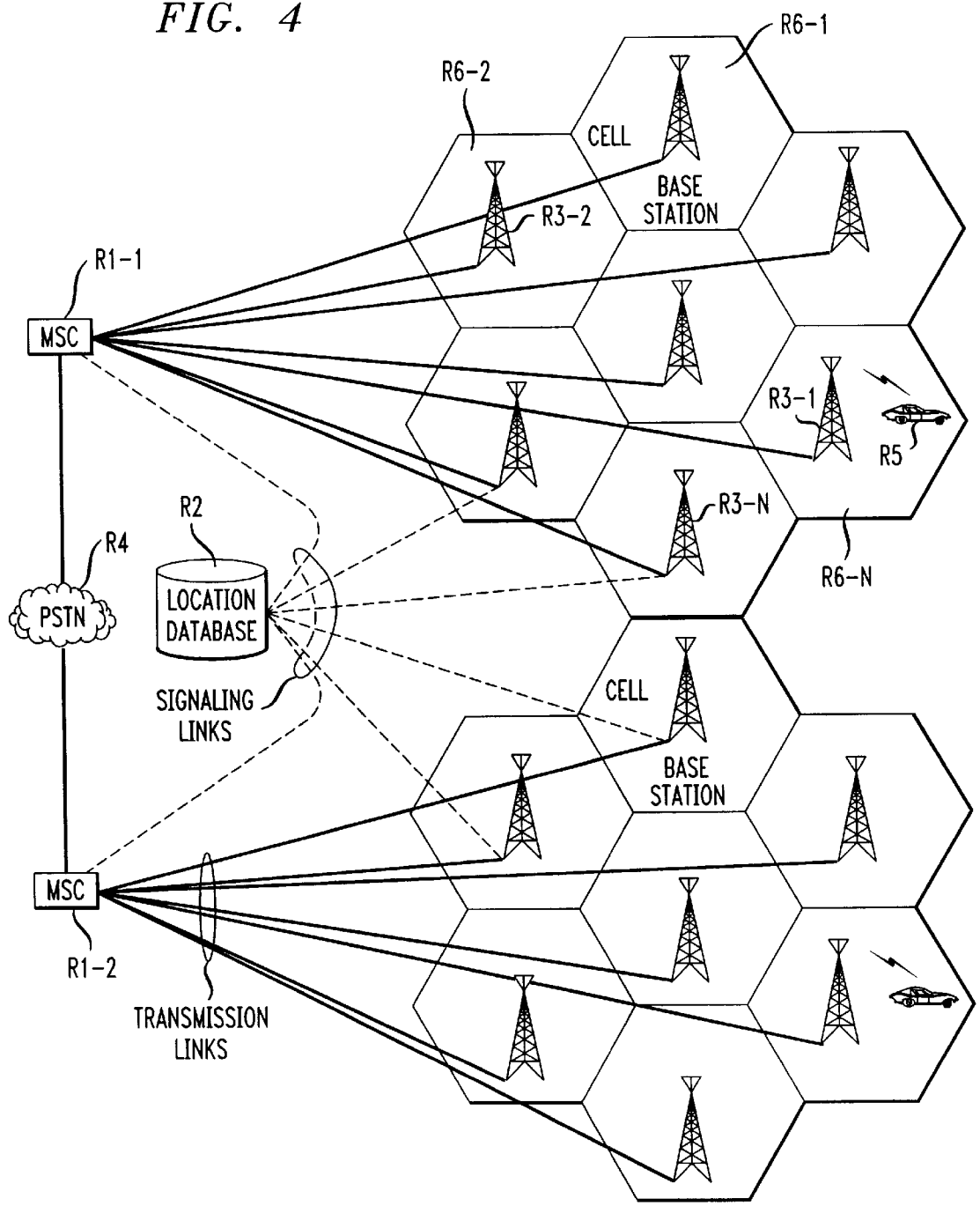
FIG. 4 shows an exemplary physical realization of the invention.

FIG. 4 shows an exemplary physical realization of the invention. The power levels of the mobile station R5 at suitable intervals are measured at the base station R3-1 serving mobile station R5 and neighboring base stations such as base station R3-N with the assistance of the MSC R1-1. The MSC knows which base stations are the neighboring base stations for each mobile station actively engaged in a call. The measurements are collected and processed by a location database R2. This information may be relayed via the base station R3-1 serving the mobile station R5, the MSC R1-1, and the transmission and signaling links to the location database R2. The location database R2 processes the power level data of the mobile station R5 and projects the probable location of the mobile station R5 into the future. The method described above can be implemented in the location database R2, which can be used to project wireless resources needs in the future, as well as for other applications. Physically, the location database R2 may reside at an MSC as an adjunct processor to the switch, or at a service control point, which is an element of the advanced intelligent network (AIN) architecture. The local database R2 can be accessed by MSCs or other databases and call control/application processors (if not locally implemented) via a signaling network such as the signaling system number 7. Also, a local database R2 can be configured to serve a large cellular geographic serving area, such as a metropolitan area including several MSC serving areas.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for predicting a location of a mobile unit in a mobile communications network including a plurality of cells, each of the cells having a base station, said method comprising the steps of:

measuring a first series of instantaneous signal strength values over time between a mobile unit and a base station in a current cell where the mobile unit is located;

measuring a second series of instantaneous signal strength values over time between the mobile unit and base stations in neighboring cells;

projecting signal strength values between the mobile station and the base station of the current cell and the mobile station and the base stations of the neighboring cells for a future time based on the first and second series of instantaneous signal values;

determining a handover time when the projected signal strength value between the mobile station and the base station of the current cell is not less than an outgoing handover threshold; and selecting a neighboring cell in which the projected signal strength value between the mobile station and the base station in the neighboring cell is greater than an incoming handover threshold at the handover time, wherein a predicted location of the mobile station after the handover time is in the selected neighboring cell and the predicted location of the mobile station before the handover time is in the current cell.

2. The method according to claim 1, wherein the step of selecting includes the steps of:

identifying the neighboring cells in which the projected signal strength value between the mobile station and the base station of the neighboring cell is greater than an incoming handover threshold at the handover time; and comparing the projected signal strength values between the mobile station and the base stations of the identified neighboring cells.

3. The method according to claim 2, wherein said step of comparing includes finding the neighboring cell having the highest projected signal strength value over the longest projected duration.

4. The method according to claim 1, wherein said step of measuring the first series of instantaneous signal strength values includes measuring the first series of instaneous signal strength values in the forward direction and wherein said step of measuring the second series of instantaneous signal strength values includes measuring the second series of instantaneous signal strength values in the forward direction.

5. The method according to claim 1, wherein said step of measuring the first series of instantaneous signal strength values includes measuring the first series of instantaneous signal strength values in the reverse direction and wherein said step of measuring the second series of instantaneous signal strength values includes measuring the second series of instantaneous signal strength values in the reverse direction.

6. The method according to claim 1, wherein said step of projecting includes extrapolating the signal strength values between the mobile station and the base station of the current cell and the mobile station and the base stations of the neighboring cells for the future time using velocity and direction of the mobile unit determined from the first series and second series of instantaneous signal strength values.

7. The method according to claim 1, wherein said step of projecting includes extrapolating the signal strength values between the mobile station and the base station of the current cell and the mobile station and the base stations of the neighboring cells for the future time using a propagation model.

8. The method according to claim 1, wherein instantaneous signal strength values are measured at periodic intervals.

9. The method according to claim 8, wherein the periodic intervals are preset based on size of the current cell.

10. The method according to claim 8, wherein the periodic intervals are set based on estimated velocity of the mobile unit in the current cell.

11. The method according to claim 8, wherein the periodic intervals are set based on a time-of-day.

12. The method according to claim 1, wherein wireless resource needs of the mobile unit are anticipated based on the predicted location of the mobile unit.

13. The method according to claim 1, wherein wireless resources for the mobile unit are allocated in the selected neighboring cell based on the predicted location of the mobile unit.

14. The method of claim 1, wherein said outgoing handover threshold is less than said incoming handover threshold.

15. A mobile communication system method, comprising the steps of:

setting values of an incoming threshold and an outgoing threshold;

measuring a plurality of instantaneous signal strength values of signals between a mobile unit and a plurality of base stations;

extrapolating signal strengths (i) between said mobile unit and a current base station, and (ii) between said mobile unit and a neighboring base station, for a future period of time; and determining a handover time wherein, at said handover time, an extrapolated signal strength between said mobile unit and said current base station is not less than said outgoing threshold, and an extrapolated signal strength between said mobile unit and said neighboring base station is greater than said incoming threshold.

* * * * *